(12) United States Patent
Axmacher et al.

(10) Patent No.: US 7,137,370 B2
(45) Date of Patent: Nov. 21, 2006

(54) GEARBOX COMPRISING TWO ROTATABLE DISKS WHICH ARE ARRANGED INSIDE EACH OTHER AND ARE CONNECTED BY MEANS OF A SWASH PLATE

(75) Inventors: Detlef Axmacher, Iserlohn (DE); Massimiliano Gasparro, Halver (DE); Dirk Neubauer, Nachrodt-Wiblingwerde (DE); Frank Pachan, Dortmund (DE); Lars Pfuetzenreuter, Werdohl (DE); Markus Wilke, Nuertingen (DE)

(73) Assignee: AFT Atlas Fahrzeugtechnik GmbH, Werdohl (DE)

( * ) Notice: Subject to any disclaimer, the term of this patent is extended or adjusted under 35 U.S.C. 154(b) by 58 days.

(21) Appl. No.: 10/509,438

(22) PCT Filed: May 20, 2003

(86) PCT No.: PCT/DE03/01620

§ 371 (c)(1),
(2), (4) Date: Sep. 23, 2004

(87) PCT Pub. No.: WO03/098010

PCT Pub. Date: Nov. 27, 2003

(65) Prior Publication Data

US 2005/0145049 A1 Jul. 7, 2005

(30) Foreign Application Priority Data

May 22, 2002 (DE) ................. 102 22 475

(51) Int. Cl.
F01L 1/34 (2006.01)
(52) U.S. Cl. ................. 123/90.17; 123/90.15; 123/90.31
(58) Field of Classification Search ........ 123/90.15, 123/90.16, 90.17, 90.18, 90.27, 90.31; 74/567, 74/568 R, 640, 721
See application file for complete search history.

(56) References Cited

U.S. PATENT DOCUMENTS 4,294,218 A 10/1981 King et al.
4,515,110 A * 5/1985 Perry ................... 123/41.37
6,523,512 B1 2/2003 Axmacher et al.

FOREIGN PATENT DOCUMENTS

DE 10038354 2/2002
JP 59115412 10/1984

* cited by examiner

Primary Examiner—Thomas Denion
Assistant Examiner—Ching Chang
(74) Attorney, Agent, or Firm—W. F. Fasse; W. G. Fasse

(57) ABSTRACT

A gear arrangement has two turntables nested or arranged concentrically in one another, and interconnected with one another via a swashplate. The gear arrangement preferably is used for adjusting the angle of rotation of the camshaft relative to the angle of rotation of the crankshaft of an internal combustion engine to affect the control times of the charge-cycle valves of the engine. The swashplate is connected with the first turntable formed as a camshaft gear via at least one pin, and the swashplate is connected with the camshaft via the second turntable by means of a gear ring.

10 Claims, 1 Drawing Sheet

GEARBOX COMPRISING TWO ROTATABLE DISKS WHICH ARE ARRANGED INSIDE EACH OTHER AND ARE CONNECTED BY MEANS OF A SWASH PLATE

CROSS-REFERENCE TO RELATED APPLICATIONS

This application is a 35 U.S.C. 371 national stage application of PCT international application PCT/DE03/01620 filed May 20, 2003, and claims the 35 U.S.C. 119 priority of German application 102 22 475.7 filed May 22, 2002.

BACKGROUND OF THE INVENTION

1. Field of the Invention

The invention relates to a gear with two turntables arranged into one another, which are interconnected via a swashplate, as it is described for instance in DE 100 38 354 A1.

2. Description of the Related Art

A gear, which as a control device for adjusting the angle of rotation of a first turntable relative to the angle of rotation of a second turntable, which are interconnected via a swashplate, is disclosed by generic DE 100 38 354. Here, the first turntable is formed by a camshaft, and the second turntable is formed by a camshaft gear of an internal combustion engine, which gear is connected with a crankshaft.

Here, gear rings with a different number of teeth are formed at the camshaft gear and at the camshaft, with which gear rings a gear ring arranged at the swashplate is engaging. When rotating the swashplate, the different number of teeth of the gear rings effect shifting of the angle of rotation of the camshaft relative to the camshaft gear. This requires very precise manufacturing of the gear rings with high manufacturing accuracy, what, in fact, causes high costs.

SUMMARY OF THE INVENTION

It is an object of the invention to provide a gear with a swashplate as generally described above, but for which connection between the swashplate and the turntables can be produced in a cost-saving way.

In accordance with the invention this object is achieved by a gear with two turntables arranged into one another, which are interconnected via a swashplate, wherein the swashplate is connected with the first turntable via at least one pin, and with the second turntable via a gear ring.

In principle, this pin can be formed at the swashplate or at the first turntable. In case of more than one pin they can also be formed at the swashplate and at the turntable. In this case the pin can be produced in one piece with the swashplate or with the first turntable. As an alternative, the pin can be connected with the swashplate or with the first turntable for instance by gluing, welding, force fitting, soldering or screwing in.

The counterpart of the pin for connecting the swashplate and the first turntable is formed by a recess, which is slot-shaped due to the motion of the swashplate.

In a further embodiment of the invention it is provided that the pin and the slot-shaped recess form a sliding pairing, a bushing made of a material capable of sliding being set as a counter bearing onto the pin and/or into the slot-shaped recess. This bushing can be made for instance of teflon, gray iron, brass or bronze.

In particular, when using more than one pin the bushing set as a counter bearing onto the pin and/or into the slot-shaped recess is provided for compensating process tolerances. Thus, bushings with varying wall thickness for setting onto the pin(s) can be provided for assembly of the gear. Accordingly, bushings for setting into the slot-shaped recess can be produced, their slideway for the pin not being formed in the center of the bushing. With accordingly complex built bushings the position of the slideway of a bushing for setting into a slot-shaped recess can be adjusted for instance by screwing.

In a further development of the invention it is provided that for the connection between the swashplate and the two turntables an own lubricant supply is provided, which for instance consists of a nozzle connected with the oil circuit, which nozzle sprays the pin and the gear ring with motor oil when operating the gear.

In a last embodiment of the invention means are provided, such that the first and the outer turntable are formed as a camshaft gear of an internal combustion engine, which gear is connected with a crankshaft, and that the second and inner turntable is connected with a camshaft of the IC engine, and that the gear is formed for adjusting the angle of rotation of the camshaft relative to the angle of rotation of the crankshaft.

In the following the gear according to the invention with two turntables arranged into one another, which are interconnected via a swashplate, will be explained in the ensuing description of an example embodiment taken in conjunction with two drawings.

DESCRIPTION OF THE PREFERRED EMBODIMENTS

The operating mode of a gear with a swashplate for adjusting the angle of rotation of the camshaft relative to the angle of rotation of the crankshaft for affecting the control times of the valve clearance of the charge-cycle valves of an IC-engine is based on the fact that a swashplate arranged on the drive shaft of a control unit comprises an axial bevel relative to this drive shaft and to the camshaft, and thus is rotatably arranged on the drive shaft.

Figure 1:
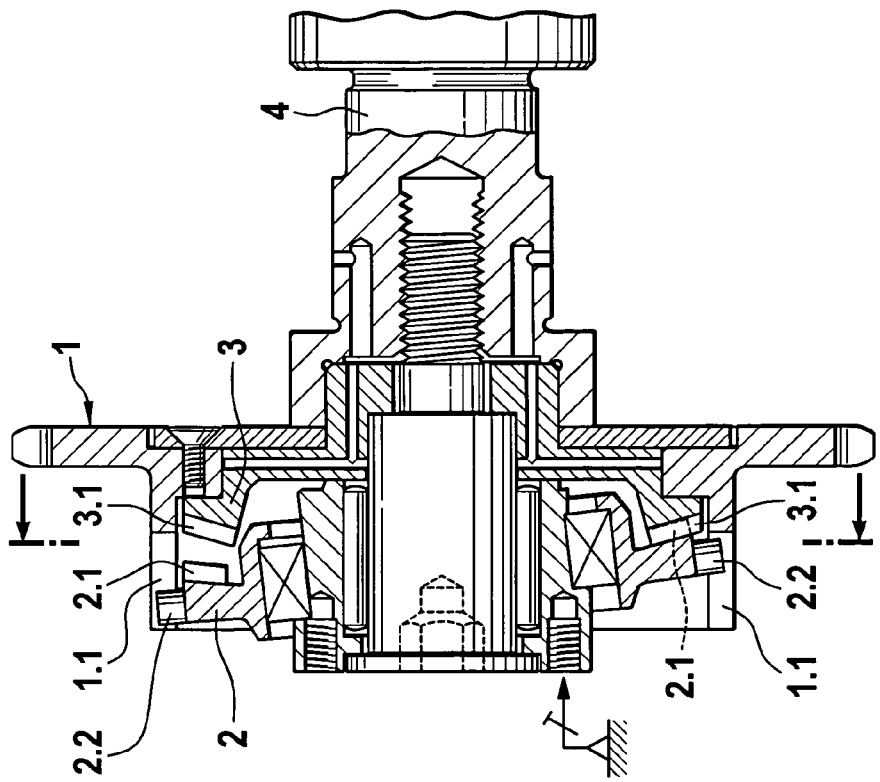
FIG. 1 shows an axial cross-section through a gear with a swashplate, the first turntable being formed as a camshaft gear, and the second turntable being formed as a component connected with a camshaft.

In FIG. 1 a swashplate 2 connecting the camshaft 4 and the camshaft gear 1 is shown in a cross-section, whereby the camshaft gear 1 forming a turntable is connected with the crankshaft of the IC (internal combustion) engine via a primary drive embodied as a control or drive chain.

The swashplate 2 comprises a first gear ring 2.1, which engages with a second gear ring 3.1 of a turntable 3, which is connected with a camshaft 4. Merely the teeth of an angle segment of the first gear ring 2.1 and of the second gear ring 3.1 intermesh with one another due to the axial tilt angle or axial bevel of the swashplate 2. The size of the angle segment, within which the two gear rings 2.1 and 3.1 are meshed or engaged with each other, depends on the axial tilt angle or axial bevel of the swashplate 2 relative to the camshaft 4 or to the drive shaft of the control unit, which drive shaft is not shown.

Moreover, the swashplate 2 comprises four pins 2.2, which radially protrude from the outer surface area of the swashplate 2. The swashplate 2 is arranged within a cup-shaped formation of the camshaft gear 1, the four pins 2.2 engaging with four recesses 1.1, which are formed in the cup-shaped formation of the camshaft gear 1. Based on the tumbling rotation of the swashplate 2, the recesses 1.1 of the camshaft gear 1 are shaped like slots. The number of the pins 2.2 as well as the manufacturing of the pins 2.2 depend from the torques, which are transferred from the camshaft gear 1 onto the swashplate 2 via the pins 2.2.

Figure 2:
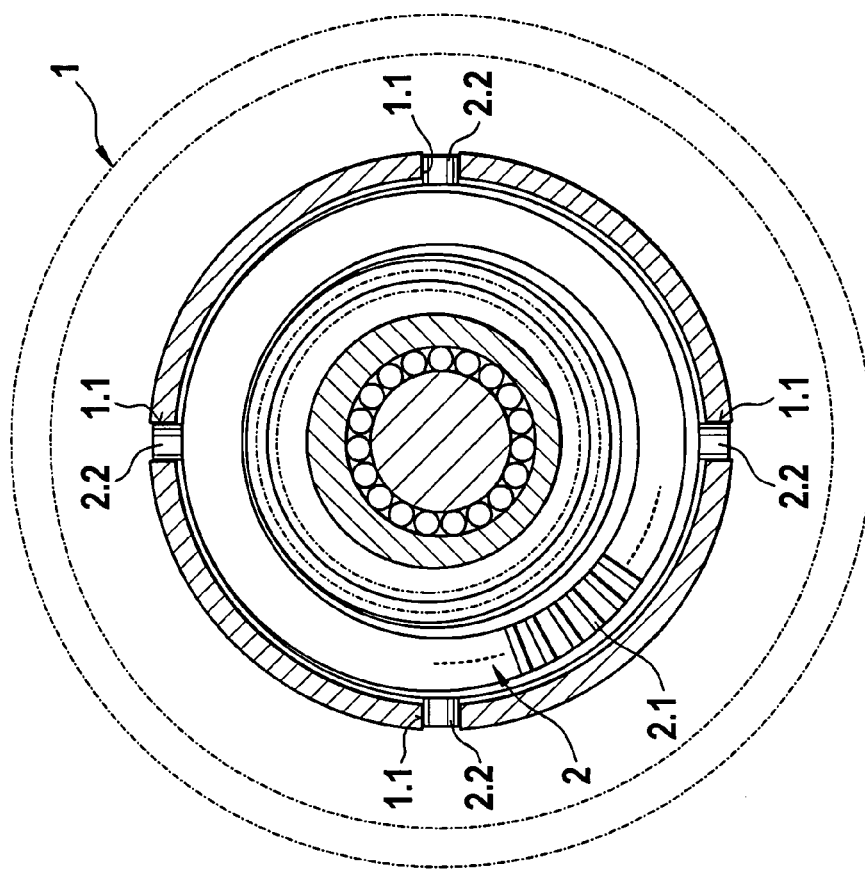
FIG. 2 shows a cross-section through the gear for depicting the swashplate bearing the pin as well as a gear ring.

In FIG. 2 four pins 2.2 formed at the swashplate 2 for an IC engine are shown, with high torques being transferred. For guaranteeing high stableness of the pins 2.2, they are produced in one piece with the swashplate 2. With minor occurring loads the pins 2.2 can be applied onto the outer surface area of the swashplate 2 for instance by friction welding.

The swashplate 2 provides for a frictional connection between the camshaft gear 1 and the camshaft 4 extending over the slot-shaped recesses 1.1, the four pins 2.2 and the two gear rings 2.1, 3.1. If the swashplate 2 is not driven by the control unit, this frictional connection causes the camshaft gear 1 and the camshaft 4 to rotate similarly.

For affecting the angle of rotation of the camshaft 4 relative to the angle of rotation of the crankshaft, the first gear ring 2.1 of the swashplate 2 and the second gear ring 3.1 of the turntable 3 have a different number of teeth. This different number of teeth results in an off-set arising between the camshaft gear 1 and the turntable 3 in connection with the tumbling rotation of the swashplate 2. After one tumbling rotation of the swashplate 2, this off-set corresponds to the angle segment, which is spanned or covered by the teeth forming the difference in the number of teeth.

If, for example, the first gear ring 2.1 of the swashplate 2 has fifty teeth, and the second gear ring 3.1 of the turntable 3 has fifty-one teeth, a tumbling rotation of the swashplate 2 results in an off-set between camshaft 4 and camshaft gear 1 of exactly one tooth (=7.2 degrees). Correspondingly, after fifty tumbling rotations of the swashplate 2 the off-set between camshaft gear 1 and camshaft 4 is a full rotation, i.e. the translation between the camshaft gear 1 and the camshaft 4 is 50:1.

For reducing the friction resistances bushings made of teflon, which are not shown, can be arranged in the slot-shaped recesses 1.1, in which tracks of the bushings the pins 2.2 of the swashplate 2 oscillate during the tumbling rotation.

These bushings may further be used for compensating process tolerances, by providing different bushings for assembly of the gear, the tracks of the bushings being formed centrically and excentrically. If there is an off-set between the pins 2.2 of the swashplate 2 and a slot-shaped recess 1.1 of the camshaft gear 1, this off-set is compensated by a bushing with an excentrically arranged track.

Due to the friction between the gear rings 2.1, 3.1 having a different number of teeth, a nozzle connected with the oil supply of the IC engine is arranged in the area of the gear, which nozzle sprays the gear rings 2.1, 3.1 and thus the entire gear with motor oil.

On the side of the swashplate 2 opposite to the gear ring 3.1 a control unit is arranged, which is not shown and which drives the swashplate 2, this control unit being preferably embodied as an electro motor, however, it can also be realized by hydraulic systems or by a mechanic drive.

By means of the swashplate 2 connected with the camshaft gear 1 via the pins 2.2 for adjusting the angle of rotation of the camshaft 4 relative to the angle of rotation of the crankshaft, the costs for manufacturing the swashplate 2 and the camshaft gear 1 are reduced, thus providing a stable connection between the camshaft gear 1 and the swashplate 2.

What is claimed is:

1. A gear with two turntables (1, 3) arranged into one another, which are interconnected via a swashplate (2), wherein the swashplate (2) is connected with the first turntable (1) via at least one pin (2.2) such that the at least one pin will transmit torque from the first turntable (1) to the swashplate (2), and wherein the swashplate (2) is connected with the second turntable (2) via gear rings (2.1, 3.1).

2. A gear according to claim 1, wherein the at least one pin (2.2) is one piece with the swashplate (2) or with the first turntable (1).

3. A gear according to claim 1, wherein the at least one pin (2.2) is connected with the swashplate (2) or with the first turntable (1) by at least one of a glue joint, a weld joint, a force fit joint, a solder joint, or a screw joint.

4. A gear according to claim 1, wherein the at least one pin (2.2) formed at the swashplate (2) or at the first turntable (1) is arranged in a slot-shaped recess (1.1) in the first turntable (1) or the swashplate (2).

5. A gear according to claim 4, wherein the pin (2.2) and the slot-shaped recess (1.1) form a sliding pairing, and wherein a bushing made of a material capable of sliding is arranged as a counter bearing on the pin (2.2) and/or into the slot-shaped recess (1.1).

6. A gear according to claim 5, wherein the bushing is made of teflon or gray iron or brass or bronze.

7. A gear according to claim 5, wherein the bushing set as a counter bearing onto the pin (2.2) and/or into the slot-shaped recess (1.1) is provided for compensating process tolerances.

8. A gear according to claim 1, wherein a lubricant supply is provided for the connection between the swashplate (2) and the two turntables (1, 3).

9. A gear according to claim 1, wherein the first turntable (1) is the outer one of the two turntables arranged into one another and wherein the second turntable (3) is the inner one of the two turntables arranged into one another.

10. A gear according to claim 1, wherein the first turntable is formed as a camshaft gear (1) of an internal combustion engine, which camshaft gear is connected with a crankshaft, and wherein the second turntable (3) is connected with a camshaft (4) of the internal combustion engine, and wherein the gear is formed for adjusting the angle of rotation of the camshaft (4) relative to the angle of rotation of the crankshaft.

* * * * *